Figure 1:
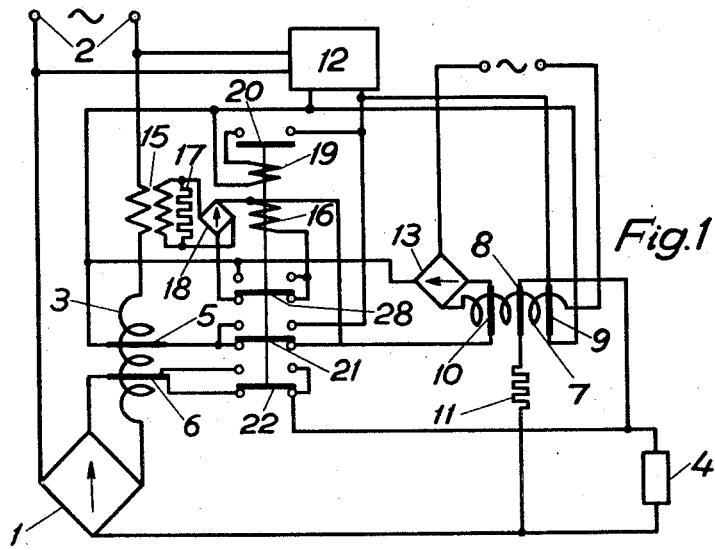

Oct. 3, 1950  H. ELMLUND ET AL  2,524,220
RECTIFIER WITH DIRECT CURRENT SATURABLE
REACTOR FOR VOLTAGE REGULATION
Filed Nov. 14, 1946  2 Sheets-Sheet 1

Inventors
Hugo Elmlund
and
Uno Lamm
By
James Aiken
Attorney.

Inventors
Hugo Elmlund
and Uno Lamm
By [signature]
Attorney.

Patented Oct. 3, 1950

2,524,220

UNITED STATES PATENT OFFICE 2,524,220

RECTIFIER WITH DIRECT-CURRENT SATURABLE REACTOR FOR VOLTAGE REGULATION

Hugo Elmlund, Ludvika, and Uno Lamm, Kopparberg, Sweden, assignors to Allmanna Svenska Elektriska Aktiebolaget, Vasteras, Sweden, a Swedish corporation Application November 14, 1946, Serial No. 709,851
In Sweden November 16, 1945

11 Claims. (Cl. 321—25)

An automatic voltage regulation of rectifiers by means of direct current saturable reactors offers, as is well known, the advantage that it can be constructed without any movable parts, such parts being subject to continuous wear and tear during operation and needing also repeated inspection for other reasons. Such a voltage regulation is sometimes combined with a current limiting device, which sets in instead of the voltage regulation, if the current for some reason should have tendency to rise above a permissible value, for instance in battery charging, if the battery should have been too heavily discharged for some reason. Such a current limitation has in voltage regulators of the aforesaid type hitherto also been made of some similar type, i. e. without any movable parts. It has, however, in some cases been found appropriate to employ in combination with a voltage regulator with a direct current saturable reactor a mechanical change-over relay which enters into action when the voltage regulation shall be replaced by a current limitation. Since such an action as a rule takes place comparatively seldom, this mechanical relay will not be subjected to such wear and tear as a constantly operating mechanical voltage regulator, and on the other hand a mechanical relay for the current limitation offers greater possibilities of variations, and therefore also greater possibilities of paying respect to all needs of the operation, than a change-over device operating only with static means. For instance, it can easily be made time-integrating, i. e. so that not the instantaneous value of the current, but its time integral over a certain time is limited to the desired value. In some cases, it may also be constructed at lower cost for corresponding operation properties. The present invention therefore comprises such a combination between a voltage regulator operating with a direct current saturable reactor and a mechanical change-over relay for current limitation.

If, in the aforesaid manner, the mechanical change-over relay shall be dependent on the time integral of the current over a certain time, it may preferably be made in the shape of a thermally operated relay. This facilitates a good adaption to the risks caused by too high a current, since these risks are generally of a thermic character, for instance an overheating of dry rectifier plates. A mechanical time limit relay of some generally known type may, however, also be employed.

Figure 2:
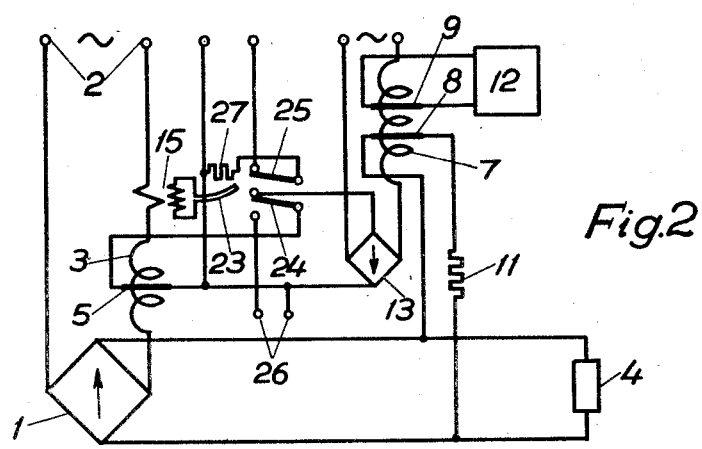
Figure 3:
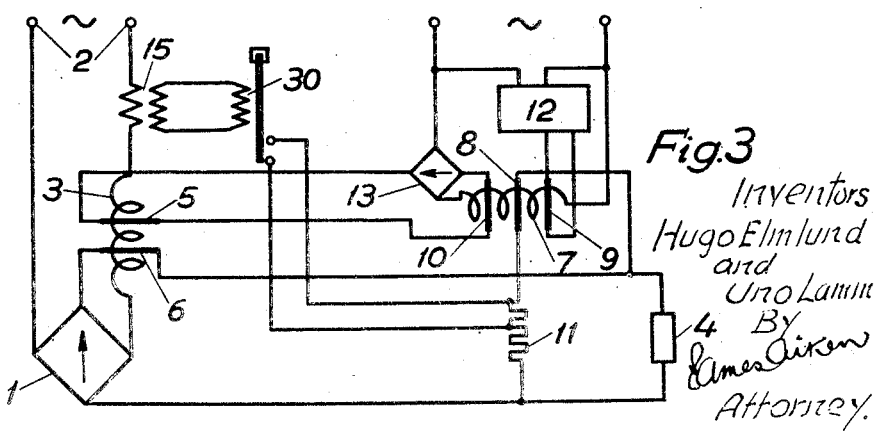
Figure 4:
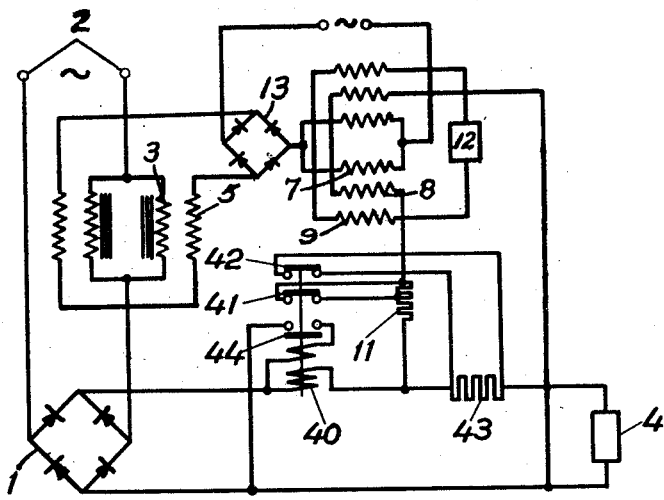

Some forms of the invention are diagrammatically illustrated in the accompanying drawing in Figs. 1-5, the saturable reactors being shown in greater detail in Fig. 4 than in the other figures.

Fig. 1 shows a connection, in which the changing-over depends on a direct current-responsive, non-time-integrating relay of electromagnetic type. 1 is the main rectifier which is fed from a pair of alternating current terminals 2 across a direct current saturable reactor 3 and which in its turn feeds a direct current load 4, for instance a battery with or without another load in parallel. The reactor 3 has in Fig. 1 been shown with a control winding 5 and a self-magnetizing winding 6, which latter may frequently in practice be replaced by valves connected in series with elements of the main alternating current winding, connected in parallel for the alternating current, so as to make the said current circulate as a pulsating direct current through said winding elements, in a manner known per se. The control winding 5 is fed from an auxiliary direct current saturable reactor 7 having direct current windings representing the responsive quantity and the normal quantity of a regulator, so that the current of the auxiliary reactor represents the deviation of the regulated quantity from its normal value or the so-called differential quantity. This quantity may, however, instead be produced in another comparison member, for instance in the main reactor itself. In Fig. 1, the reactor 7 has a winding 8 which is connected to the direct current voltage through a resistance 11 and thus represents the voltage-responsive quantity, a winding 9 connected to a constant voltage device 12 and thus representing the normal quantity, and a self-magnetizing winding 10 which in the aforesaid manner can be replaced by a spare-self-magnetizing winding. The reactor 7 controls a rectifier 13, which feeds a winding 5 of the main reactor.

For the changing-over to current limitation, a current transformer 15 is in Fig. 1 connected in the main circuit on the alternating current side and feeds a relay coil 16 in parallel with a resistance 17. The relay coil is fed through a rectifier 18 in order to obtain a more uniform attractive force and a polarized action. It may of course instead be connected on the direct current side in the main circuit or in a shunt. Another coil 19 on the same relay is connected to the constant voltage device through a hold-in contact 20. Its function has to do with the return from current limitation to voltage regulation and will be described later.

When the relay is energized on account of a current increase in the coil 16 above a certain limit, its contact 21 changes the connection of the coil 5 of the reactor 3 from the voltage regulating auxiliary reactor 7 to the constant voltage device 12. It may instead be connected to another voltage source having an only approximately constant voltage. Hereby the main reactor will regulate essentially to constant current as long as this connection persists. At the same time, a contact 22 on the relay preferably effects the changing to a lower self-magnetisation of the reactor, since otherwise there is a certain risk that the current transformer character of the direct current saturable reactor is lost.

A further contact 28 of the relay changes, when it is energized, the connection of the coil 16 from the current transformer 15 to the auxiliary reactor 7. A consequence of this is that the relay is again deenergized, when the current of the reactor 7 sinks below a certain value, which implies that the direct current voltage of the rectifier approaches the normal value. As the deenergizing should as a rule not be made until this value has been fully restored, in which case the current from the reactor 7 has sunk practically to zero, the coil 19 is provided for giving the relay an additional attracting force, which lies somewhat below the attracting force from the coil 16 for which an energizing has taken place. The relay may if desired be completed by a mechanical damping, especially with one active at the energizing, so that not to be moved before the current has been kept at the energizing value during a certain time.

Fig. 2 shows a connection which is similar to that shown in Fig. 1 in essential respects, but in which the relay is of a thermic character and thus to a certain extent time-integrating. The parts designated by 1—4 correspond to those designated in a corresponding manner in Fig. 1. The main direct current saturable reactor 3 has a control winding 5, while the self-magnetisation generally present is not particularly shown. The auxiliary reactor serving as a comparison device is also here designated by 7 and is also shown without a separate self-magnetisation, thus with only a voltage-responsive winding 8 fed through a resistance 11 and a winding 9 opposing the former and fed from a constant voltage device 12. The auxiliary reactor controls a rectifier 3, which normally feeds the winding 5 of the main reactor.

For changing the connection to current limitation, there is in Fig. 2 employed a thermic relay having a bimetallic spring 23 fed from a current transformer 15 in the alternating current main circuit. The bimetallic spring operates a pair of contacts 24, 25, which may be provided with means of some known kind for effecting an instantaneous motion. Normally these contacts are in their upper position shown. When they are moved to the lower position under the influence of the bimetallic spring, the contact 24 breaks the connection between the auxiliary reactor and the winding 5 and connects instead said latter winding to a separate current source 26, whereby the main reactor will furnish a substantially constant current. If it is self-magnetized, a similar change of connection may at the same time be made as that which is effected in Fig. 1 by the contact 22.

The other contact 25 of the thermic relay serves to prepare its return to the original position. Normally it keeps a circuit closed from a constant voltage through a resistance 27 which co-operates in heating the bimetallic spring 23. When the change of connections is made, this resistance is instead connected to the outgoing circuit of the auxiliary reactor. As normal conditions are restored, the current in this circuit sinks, and thereby also the temperature of the resistance 27. The relay can be so adjusted that when the outgoing current from the auxiliary reactor sinks to zero and the voltage thus is normal, the temperature of the bimetallic spring has sunk so much that a restoration is effected.

The device according to Fig. 2 can be modified in such manner that the bimetallic spring shown or some other thermically actuated contact energizes a separate relay, which in its turn effects the change of connection of the magnetizing winding 5 from the primary comparison member to a source of essentially constant current. This has among others the advantage that less restraint is encountered in constructing the thermally actuated member, so that it may for instance be mounted on a valve plate or other part of the rectifier itself instead of being connected to a current transformer. It is in such case possible to employ several thermic members connected in different places in the circuits, of which members that enters into action, the temperature of which lies most close to the value critical with respect to its place. If these members act by closing contacts, these contacts may lie in parallel, while they should lie in series, if the action is effected by breaking. The separate relay energized by the thermic contact or contacts may be kept energized by the differential current of the comparison member in a purely electromagnetic way in analogy with the thermic retaining by means of the resistance 27 in Fig. 2, so as to be deenergized, when the voltage has again become normal. The relay may also be provided with additional magnetisation for facilitating the energizing, said additional magnetisation being also connected in circuit by the thermic contact and being disconnected by means of an auxiliary contact after the energizing has taken place.

Another possible modification of Fig. 1 or 2 is to adapt the voltage between the points 26 so that the current, to which the saturable reactor regulates after the change of connections, will be smaller than that for which the relay has been energized, or to provide for the same purpose the relay with an auxiliary winding which is cut out at the energizing. In such case the relay returns spontaneously after a while and then continues to go in and out as long as the current tends to exceed the permissible value. After these conditions have ceased, the normal voltage regulation begins again without any particular restoring being necessary for this purpose, as in Fig. 2.

In Fig. 3, the change of connections is also effected by means of a thermic relay 30 which is only diagrammatically indicated, and which is fed from a current transformer 15 in the alternating current main circuit. The relay 30 has a contact which, in exceeding a certain temperature, short-circuits a portion of the resistance 11 in the voltage-responsive circuit of the auxiliary reactor. Here no direct regulation to constant current is therefore obtained, but in the first line a reduction of the voltage on the load 4 which causes a reduction of the current. By suitable dimensioning of the voltage-responsive circuit with regard to the conditions of operation, the current can hereby be kept at a permissible value. The whole may also be so dimensioned that the voltage and thereby the current intermittently oscillates between a higher and a lower value at a rate depending on the heat capacity of the relay, the medium value being substantially the permissible one. The relay 30 may also be provided with two or more contacts which gradually short-circuit portions of the resistance 11, until the current has been reduced to a permissible value.

In this connection no special restoring device is necessary, as it returns automatically as soon as the current has been reduced by the change of connection. The figures 1—13 designate corresponding parts to those of Fig. 1. As in Fig. 2, the thermic relay may be directly heated by some part traversed by the main current, for instance by a plate of the main rectifier, instead of being fed from a current transformer.

In Fig. 4, an electromagnetic relay is again used for the change of connections, the coil 40 of said relay being connected in the direct current main circuit. This relay acts in analogy with the relay in Fig. 3 in such manner as to effect a change of connection in the responsive circuit of the auxiliary reactor, but as distinguished from Fig. 3, it connects in circuit a portion of the resistance 11 by a contact 41, so as to make the regulator regulate to a higher voltage. At the same time, however, the relay by means of another contact 42 connects a resistance 43 in the direct current main circuit, such resistance being so dimensioned that the main current is reduced in spite of the increase of voltage. Especially in devices for battery charging, this connection has been found to give a soft and favorable regulation. Also in this case it may be suitable to effect the change of connections in two or more steps at different current values. The figures 1—5, 7—9, 11 and 12 here designate corresponding parts to Fig. 1, but no special self-magnetizing windings are shown on the two reactors. 44 designates a hold-in contact of the relay.

Figure 5:
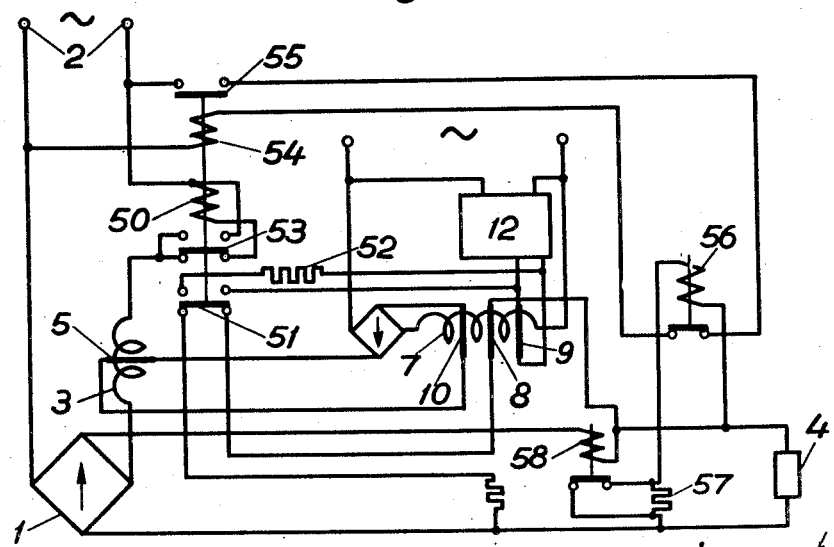

In Fig. 5, the control coil 50 of the reconnecting relay is connected directly in the alternating current main conductor. When the relay is energized, its contact 51 breaks the circuit through the voltage-responsive coil 8 of the auxiliary reactor 7, whence the auxiliary reactor under the influence of its constant current device 12 will furnish an essentially constant current to the main reactor, which therefore also furnishes an essentially constant current. In order that this current shall not be too strong, the constant current coil 9 of the auxiliary reactor is at the same time shunted by means of a resistance 52 which is connected in circuit by the aforesaid contact 51 in the energized position of the relay.

The restoring is in this form effected by means of a voltage relay 56 connected to the direct current voltage. In the control circuit thereof there is a resistance 57 which is, however, normally short-circuited by a current relay 58. The relay 56 therefore normally is in the energized position and then keeps its contact broken. When the direct current somewhat exceeds the permissible value, the relay 58 breaks its contact and thereby connects the resistance 57 in series with the relay 56 which then drops and closes its contact. At the same time or somewhat later the main relay goes in under the influence of the coil 50 and closes a hold-in contact 55, preferably somewhat before its contact 53 breaks the current through the coil 50. The main relay then is retained by the coil 54 which is connected to the alternating current voltage through the hold-in contact 55 and the contact of the relay 56. When the direct current voltage has returned to its normal value, the relay 56 again breaks its contact, provided that the direct current has been reduced so far that the relay 58 has returned and short-circuited the resistance 57. Hereby the main relay returns to its original position and the normal voltage regulation is restored.

Instead of entirely cutting out the comparison member by means of the current relay according to Fig. 1 or 2, or its voltage-responsive circuit according to Fig. 5, the said voltage-responsive circuit can be connected to be current-responsive, i. e. for instance to a current transformer. The return to voltage regulation may then preferably be effected under the influence of a separate voltage relay analogous to the relay 56 in Fig. 5. Although the comparison member is in all the figures shown in the form of a separate direct current saturable reactor, in which one direct current winding is fed by constant current and a direct current winding opposing it is fed by the regulated voltage through a resistance, it may also be made in other ways. Instead of the modification already mentioned, according to which the comparison is effected in the main reactor, the well-known comparison principle may also be adapted, for instance on the main reactor or on a separate auxiliary reactor, according to which two windings opposing each other are both fed from the regulated voltage across circuits with resistances, which are voltage-dependent in different ways. Thus, the resistance in the positively acting winding may be constant or positively voltage-dependent (with an ohmic value increasing with the voltage), while the circuit of the opposing winding is negatively voltage-dependent. For a rising voltage, the opposing winding then predominates, which causes an increased voltage drop in the main reactor. The change of connection of the comparison member to a higher or lower voltage may in each of the forms described having two opposing windings be effected in the circuit of any of these windings or in other manner.

When the action of the time-integrating current-responsive member is dependent on a time constant, as is for instance the case in thermic members, this time constant should preferably be of the same order of magnitude as that of the most sensitive of the members to be protected.

We claim as our invention:

1. An electric rectifier with automatic voltage regulation, comprising a rectifier, a direct current saturable reactor connected in series with the input of the rectifier, saturating windings on said reactor at least one of which is influenced by the direct current voltage of said rectifier, said windings opposing each other and acting to keep the said voltage constant, and a mechanically movable device for automatically shifting the connections of said saturating windings under the influence of the direct current from said rectifier so as to limit said current.

2. An electric rectifier with automatic voltage regulation, comprising a rectifier, a direct current saturable reactor connected in series with the input of the rectifier, saturating windings on said reactor opposing each other and acting to keep the direct current voltage of said rectifier constant, and a device movable under the influence of a time integral of the current of said rectifier for shifting the connections of said saturating windings.

3. An electric rectifier with automatic voltage regulation, comprising a rectifier, a direct current saturable reactor connected in series with the input of the rectifier, saturating means on said reactor influenced by an electric quantity corresponding to the deviation of the direct current voltage of said rectifier from a normal value, and a mechanically movable device for impressing substantially constant ampereturns by said saturating means.

4. An electric rectifier with automatic voltage regulation, comprising a rectifier, a direct current saturable reactor connected in series with the input of the rectifier, saturating means on said reactor, an auxiliary apparatus containing voltage responsive stationary means and other stationary means opposing same and feeding said saturating means with a current proportional to the differential action of said voltage responsive and other means, and a mechanically movable device for disconnecting said voltage responsive means from said auxiliary apparatus.

5. An electric rectifier with automatic voltage regulation, comprising a rectifier, a direct current saturable reactor connected in series with the input of the rectifier, saturating means on said reactor, an auxiliary apparatus containing voltage responsive stationary means and other stationary means opposing same and feeding said saturating means with a current proportional to the differential action of said voltage responsive and other means, and a mechanically movable device for replacing said voltage responsive means by current responsive means.

6. An electric rectifier with automatic voltage regulation, comprising a rectifier, a direct current saturable reactor connected in series with the input of the rectifier, saturating means on said reactor, an auxiliary apparatus containing voltage responsive stationary means and other stationary means opposing same and feeding said saturating means with a current proportional to the differential action of said voltage responsive and other means, and a mechanically movable device for changing the connection of said voltage responsive means to a higher voltage value and for connecting a resistance in series with said rectifier.

7. An electric rectifier with automatic voltage regulation, comprising a rectifier, a direct current saturable reactor connected in series with the input of the rectifier, saturating windings on said reactor opposing each other and acting to keep the direct current voltage of said rectifier constant, a mechanically movable device for shifting the connections of said saturating windings to limit the direct current from said rectifier, and voltage responsive means for restoring the original connection when the voltage approaches its normal value.

8. An electric rectifier with automatic voltage regulation, comprising a rectifier, a direct current saturable reactor connected in series with the input of the rectifier, saturating means on said reactor influenced by an electric quantity corresponding to the deviation of the direct current voltage of said rectifier from a normal value, a mechanically movable device for shifting the connection of said saturating means to limit the direct current from said rectifier, and means responsive to the deviation of the direct current voltage of said rectifier from the normal value and acting to restore the original connection when the said deviation has sunk to a small value.

9. An electric rectifier with automatic voltage regulation, comprising a rectifier, a direct current saturable reactor connected in series with the input of the rectifier, saturating windings on said reactor opposing each other and acting to keep the direct current voltage of said rectifier constant, a mechanically movable device for shifting the connections of said saturating windings to limit the direct current from said rectifier, and a voltage responsive relay for restoring the original connection when the voltage approaches its normal value.

10. An electric rectifier with automatic voltage regulation, comprising a rectifier, a direct current saturable reactor connected in series with the input of the rectifier, saturating windings on said reactor opposing each other and acting to keep the direct current voltage of said rectifier constant, and a mechanically movable device responsive to a certain current from the said rectifier for shifting the connections of said saturating windings to limit the said current to a lower value than that moving the said device.

11. An electric rectifier with automatic voltage regulation, comprising a rectifier, a direct current saturable reactor connected in series with the input of the rectifier, saturating windings on said reactor opposing each other and acting to keep the direct current voltage of said rectifier constant, an additional saturating direct current component on said reactor substantially proportional to the alternating current traversing same, and a mechanically movable device for shifting the connections of said saturating windings to limit the direct current from said rectifier and for disconnecting a portion of said additional saturating component.

HUGO ELMLUND.
UNO LAMM.

REFERENCES CITED

The following references are of record in the file of this patent:

UNITED STATES PATENTS

| Number | Name | Date |
| --- | --- | --- |
| 2,079,466 | Phillips | May 4, 1937 |
| 2,082,607 | Amsden | June 1, 1937 |
| 2,212,229 | Gircz | Aug. 20, 1940 |
| 2,276,822 | Bowman et al. | Mar. 17, 1942 |
| 2,333,617 | Smith | Nov. 2, 1943 |
| 2,422,958 | Embry | June 24, 1947 |
| 2,431,311 | Cronvall | Nov. 25, 1947 |

Certificate of Correction

Patent No. 2,524,220                                                           October 3, 1950

HUGO ELMLUND ET AL.

It is hereby certified that error appears in the printed specification of the above numbered patent requiring correction as follows:

Column 2, line 40, strike out the word "winding";

and that the said Letters Patent should be read as corrected above, so that the same may conform to the record of the case in the Patent Office.

Signed and sealed this 2nd day of January, A. D. 1951.

[SEAL]

THOMAS F. MURPHY,
*Assistant Commissioner of Patents.*